(12) United States Patent
Salazar

(10) Patent No.: US 7,413,329 B2
(45) Date of Patent: Aug. 19, 2008

(54) PREVENTIVE MAINTENANCE UNDERCARRIAGE LIGHTS

(76) Inventor: Joe Martin Salazar, 8738 E. Highway 103, Lufkin, TX (US) 75901

( * ) Notice: Subject to any disclaimer, the term of this patent is extended or adjusted under 35 U.S.C. 154(b) by 43 days.

(21) Appl. No.: 11/712,710

(22) Filed: Mar. 1, 2007

(65) Prior Publication Data

US 2007/0206389 A1    Sep. 6, 2007

Related U.S. Application Data

(60) Provisional application No. 60/778,629, filed on Mar. 3, 2006.

(51) Int. Cl.
*B60Q 3/00* (2006.01)

(52) U.S. Cl. ...................................... 362/485

(58) Field of Classification Search .......... 362/485, 362/495, 540, 542–543
See application file for complete search history.

(56) References Cited

U.S. PATENT DOCUMENTS

| | | | | |
|---|---|---|---|---|
| 3,936,668 | A * | 2/1976 | Siebel | 362/486 |
| 6,422,728 | B1 * | 7/2002 | Riggin | 362/540 |
| 6,746,140 | B2 * | 6/2004 | Ichikawa et al. | 362/494 |
| 6,837,600 | B2 * | 1/2005 | Chang | 362/486 |
| 2005/0111231 | A1 * | 5/2005 | Crodian et al. | 362/545 |

* cited by examiner

*Primary Examiner*—Ali Alavi
(74) *Attorney, Agent, or Firm*—Donald W. Meeker

(57) ABSTRACT

Undercarriage lights are positioned under a truck adjacent to parts of the truck requiring regular visual safety inspections to light up the parts. A control module operates the lights in coordination with an ignition switch, a manual switch outside the truck, a timer, a low light sensor, and an indicator light.

4 Claims, 2 Drawing Sheets

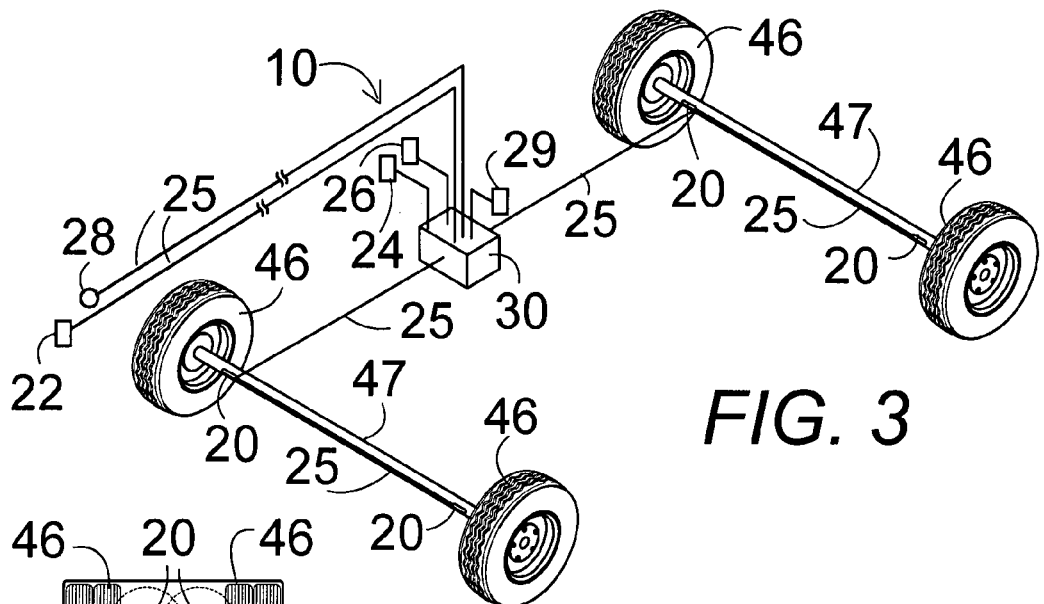
FIG. 3
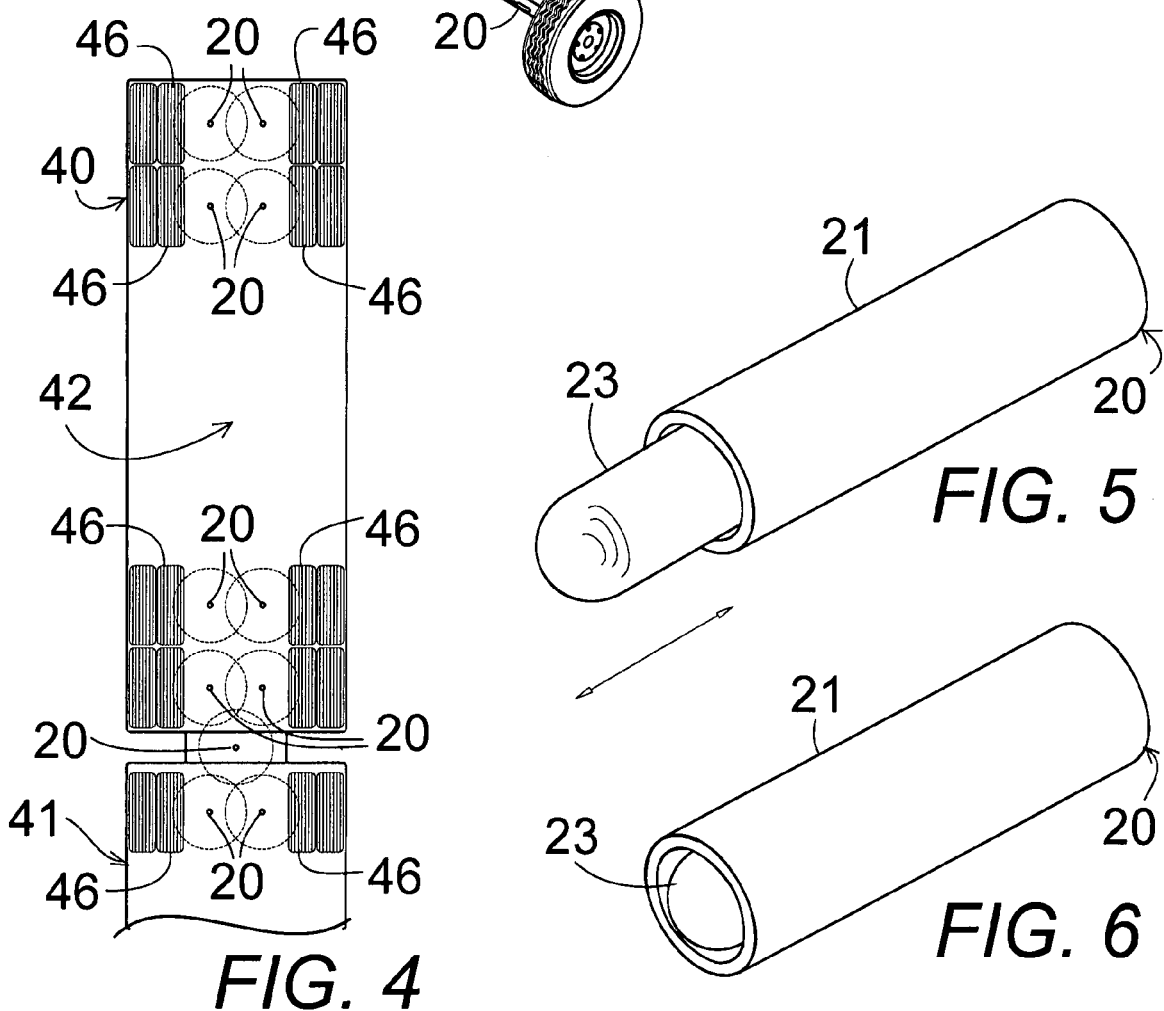
FIG. 4
FIG. 5
FIG. 6

PREVENTIVE MAINTENANCE UNDERCARRIAGE LIGHTS

CROSS-REFERENCE TO RELATED APPLICATIONS

The present utility patent application claims the benefit of provisional application No. 60/778,629 filed Mar. 3, 2006.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to vehicular lighting and particularly to a preventative maintenance undercarriage lighting system for a "tractor-trailer" or other type truck which is used to increase visibility in poor lighting conditions for visually performing safety inspections under a truck, the undercarriage lighting system comprising a plurality of retractable lights mounted to the front and rear of the undercarriage of the truck which may be retracted when not in use to protect the bulbs from road debris, an automatic timing control module, a manual trigger device and an inspection reminder system.

2. Description of Related Art Including Information Disclosed Under 37 CFR 1.97 and 1.98

To avoid accidents it is currently required that commercial drivers make a visual inspection of specific components on a tractor trailer truck. These components include the brake system, warning lights, fluids, tires, etc. The drivers are to perform the safety inspection on their truck before and after each trip.

Often the lighting conditions are poor or non-existent and it is necessary for a truck operator to climb under the truck with a flashlight to make all the necessary checks or the checks may not be made at all due to the difficulty, especially in bad weather conditions. The prior art does not adequately address the problem.

U.S. Patent Application #20030063475, published Apr. 3, 2003 by Simmons, illustrates a retractable light system which is concealed beneath a vehicle and is exposed when desired to provide rearward lighting from the vehicle. A holding frame having a rotating shaft is attached to the undersurface of the vehicle by a bearing or bracket and supports lights that rotate between a first position where the lights are retracted beneath the undersurface of the vehicle and a second position where the lights are extended below the vehicle and provide rearward lighting. The rotational mechanism for moving the lights to the deactivated and activated positions may include a motor coupled to the holding frame by a cable. Guards may be provided on the light system to protect the lights from damage. The holding frame may be attached to an accessory trailer hitch beneath the vehicle rather than directly to the vehicle. And, the retractable light system may be activated or deactivated by a remote control device such as a key chain remote.

U.S. Patent Application #20050036327, published Feb. 17, 2005 by Patel, claims an accent lighting system for automobiles that includes one or more light bars, which may have a flat rectangular cross-section, and may be rigid and flexible body. A microcontroller provides control of the operation of the light bars to display various lighting patterns and sequences. In one embodiment, the controller is coupled to the audio output of the audio system in the automobile, which controls the light patterns of the light bars in reaction to audio characteristics (e.g., frequency, amplitude, etc.) of the audio output. In another embodiment, users can select different display modes through a remote control that is operated within the comfort of their automobiles. In anther aspect of the present invention, the lighting system comprises light bars that incorporate a plurality of Light Emitting Diodes (LEDs), and in particular "super-bright" LEDs, as their light source.

U.S. Patent Application #20060158893, published Jul. 20, 2006 by Wilkerson, describes a telescoping automobile wheel illuminating device having one end for attachment within a wheel well and an opposite end having a light source, wherein the device can be activated to extend the light source out of the wheel well to illuminate a tire rim and retract the light source back into the wheel well when not in use.

U.S. Patent Application #20050242969, published Nov. 3, 2005 by Deutsch, discloses a decorative light system for the undercarriage of motor vehicles; the system includes a handheld remote control unit is capable of generating a wireless or infrared signal containing one or more commands. A sensor is capable of recognizing the signal from the remote control and generates a sensor signal responsive thereto. A CPU is operable on direct current and contains a microcontroller and connected to said sensor to thereby generate a control signal responsive to said sensor signal. The CPU also has an input for receiving a signal containing sound information and is capable of coordinating the control signal with the sound information. A light unit has a substantially weather resistant housing made at least partially of light penetrable material and contains therein a plurality of LEDs operatively connected to said CPU, said plurality of LEDs being capable of generating light containing one or more wavelengths responsive to the control signal from the CPU.

U.S. Patent Application #20050063194, published Mar. 24, 2005 by Lys, indicates vehicle lighting methods and an apparatus, in which an LED-based light source is configured to generate at least visible radiation associated with a vehicle. The light source is controlled such that the generated visible radiation has a variable color over a range of colors including at least three different perceivable colors. Examples of vehicles in which such methods and apparatus may be used include, but are not limited to, an automobile, airplane, boat, non-motorized vehicle, etc. The LED-based light source may be disposed inside the vehicle (e.g., dashboard, instrument panel) or outside the vehicle (e.g., brake lights, undercarriage lighting), and may be controlled to generate white light as one of the perceivable colors. A user interface may be employed to facilitate an adjustment of the variable color of the generated visible radiation. Additionally, information relating to at least one condition associated with the vehicle may be employed to control the LED-based light source such that the variable color of the generated visible radiation is based at least in part on the condition associated with the vehicle.

U.S. Pat. No. D497,442, issued Oct. 19, 2004 to Patel, is for the ornamental design for a flat undercar light bar.

U.S. Pat. No. 5,558,426, issued Sep. 24, 1996 to Cabanatan, provides a set of automotive wheel lights for illuminating the wheels of an automobile in operation at night which comprises a plurality of lights, one for each wheel, each mounted on the frame of the automobile near a respective wheel. Each light includes a light bulb in a socket, held fixed at its lighting position at the lighting end of a rigid arm bent towards the wheel of the automobile and mounted onto and extending from the automobile; the light bulb is encased in a protective light bulb cover and lens in one which directs illumination onto the entire outside surface of the wheel. The light bulb in the socket is electrically connected to the power source of the automobile sharing a single switching control with the parking lights and headlights of the automobile.

U.S. Pat. No. 6,997,591, issued Feb. 14, 2006 to Krumholz, shows a synchronized flashing lighting device, most specifically designed for mounting inside and outside an automobile, which is comprised of a housing and, within in, a circuit for storing at least one flashing sequence signal. At least one first array of light-emitting elements is close to this housing and generates a flashing pattern responsive to the flashing sequence signal, and at least one second array of light-emitting elements are arranged more remotely from the housing than the at least one first array and is also responsive to said flashing signal. In this way the circuit actuates said the two arrays or series of arrays in a way substantially contemporaneous with the same flashing pattern so that observation of any one array conveys information regarding the flashing pattern displayed in the other array.

U.S. Pat. No. 6,392,559, issued May 21, 2002 to Sharpe, Jr., claims an underbody lighting system for illuminating the exterior of an automotive vehicle having a remotely controlled lamp or set of lamps mounted to the underside of the vehicle for providing illumination both below the vehicle and under the vehicle when the vehicle is stationary the lamps illuminate upon receipt of a predetermined signal from a transmitter. The lamps may also illuminate upon opening a vehicle door to illuminate the path of an exiting passenger.

U.S. Pat. No. 6,902,305, issued Jun. 7, 2005 to Wainwright, describes a method of locating the position of a vehicle for the driver thereof, characterized in that use is made of the surface area around the vehicle by projecting a light beam from the vehicle or vehicle part to be located substantially downwards on to the surface, such that at uninhibited projection thereof, a lighted spot is created on the surface, at least substantially outside the circumference of the relevant vehicle part as seen in plan view. The invention specifically supports safe overtaking maneuvers of large vehicles like trucks. The invention further includes a device, a vehicle and an adapted road for performing the method, and based thereupon.

U.S. Pat. No. 6,543,917, issued Apr. 8, 2003 to Berlinghof, discloses a position indicating device that can be mounted to a truck, which comprises an electric lamp and an adjustable mounting arrangement for mounting the lamp to a rear end of the truck. The lamp is connectable to the truck's battery and has a convergent lens for emitting a focused beam of light when the lamp is illuminated. A position indicating device is mounted to the rear end of the truck near opposite corners of the truck defined between the rear end and sides thereof. The position of each lamp is adjusted so as to produce a beam of light that is directed downwardly onto a ground surface thereby to form a spot of light on the ground. The spots of light, being spaced from the truck, can be observed by the driver of the truck via the truck's rear view mirrors, thereby enabling the driver to judge the proximity of the spots of light and hence the truck, to the boundary of a confined area in which the truck is to be maneuvered.

U.S. Pat. No. 5,209,559, issued May 11, 1993 to Ruppel, indicates a vehicle lighting system for use with trucks or trailers which assists a driver in observing conditions at the rear of the vehicle at night when backing, turning corners and the like by illuminating the rear wheels and areas adjacent the rear wheels of the vehicle. The lighting system includes a light unit mounted under a vehicle body above but forwardly and/or rearwardly of the rear wheels with the light unit being constructed in such a manner to direct a light beam downwardly and outwardly in relation to the vehicle body and wheels to illuminate ground surface areas and obstacles that may exist up to a certain height to enable a driver to more safely operate a vehicle at night and avoid the possibility of the light shining into the eyes of other vehicle operators.

U.S. Pat. No. 5,682,138, issued Oct. 28, 1997 to Powell, puts forth an illumination system for a semi-trailer or the like for illuminating the rear wheel assembly of a wheeled vehicle for a predetermined period of time in response to actuation of a turn signal. An auxiliary light and corresponding circuit are provided on the underside of a semi-trailer or other wheeled vehicle, the light being turned on in response to actuation of the turn signal on the same side of the vehicle so as to illuminate the rear wheel assembly. The light remains on for a predetermined period of time after the turn signal is turned off or de-actuated, due to the dissipation of charge in a storage capacitor provided in the circuit. The circuit operatively associated with the auxiliary light is provided with a switching transistor as well as the storage capacitor, the transistor functioning to cause the auxiliary light to be illuminated when both (i) the vehicle's lights are on; and (ii) the turn signal on the appropriate side of the vehicle is actuated.

U.S. Pat. No. 6,422,728, issued Jul. 23, 2002 to Riggin, concerns a safety light for a vehicle. The safety light includes a housing defining a retaining space. The housing is mountable to the vehicle proximate the rear end thereof. The safety light further includes a light source supported within the retaining space of the housing such that the light source projects a visual line of reference from the housing and onto a roadway on which the vehicle is traveling substantially coextensive to the rear end of the vehicle and perpendicular to the direction of travel of the vehicle so that the driver of the vehicle is able to determine the position of an adjacent obstacle relative to the rear end of the vehicle.

U.S. Pat. No. 5,430,625, issued Jul. 4, 1995 to Abarr, illustrates an illumination system for a semi-tractor and trailer includes a pair of illumination housings, one attached to either side of the trailer just above the rear wheels. A reflector within each housing reflects light from a light source downward and outward through a clear lens to encompass an arc extending from the vertical to a predetermined angle, e.g. approximately 45 degrees from vertical. Light is thus directed onto the pavement and any objects immediately adjacent the trailer rear wheels to aid the driver in close quarter maneuvering, turns, and when changing highway lanes. A control circuit is connected to each light source and to the turn signal lead on the respective trailer side to provide steady power to the light source only when the turn signal and/or emergency flasher circuit is enabled.

Two U.S. Pat. No. 6,671,646 issued Dec. 30, 2003 and No. 6,804,626 issued Oct. 12, 2004 to Manegold, are for a system and process to ensure performance of mandated safety and maintenance inspections comprising a handheld, portable device which is used to store data that indicates an operator was sufficiently close to each of a plurality of components during a safety inspection to actually inspect the components. The portable device includes a sensor that detects tokens, such as radio frequency identification tags, which are affixed adjacent to the components. Messages appearing on a display of the portable device prompt the operator to proceed to each checkpoint, determine a state of the component disposed there, and if the component is not operating properly, indicate a plurality of predefined conditions from which the operator can choose to identify the observed condition of the component. The state and condition of each component entered during the safety inspection are stored as data that are subsequently transferred to a remote data storage site over a wire or wireless link.

What is needed is a preventative maintenance undercarriage lighting system for a "tractor-trailer" or other type truck which is used to increase visibility in poor lighting conditions for visually performing safety inspections under a truck, the undercarriage lighting system comprising a plurality of retractable lights mounted to the front and rear of the undercarriage of the truck which may be retracted when not in use to protect the bulbs from road debris, an automatic timing control module, a manual trigger device and an inspection reminder system.

BRIEF SUMMARY OF THE INVENTION

An object of the present invention is to provide a preventative maintenance undercarriage lighting system for a "tractor-trailer" or other type truck which is used to increase visibility in poor lighting conditions for visually performing safety inspections under a truck, the undercarriage lighting system comprising a plurality of retractable lights mounted to the front and rear of the undercarriage of the truck which may be retracted when not in use to protect the bulbs from road debris, an automatic timing control module, a manual trigger device and an inspection reminder system.

In brief, a preventative maintenance undercarriage lighting system for a "tractor-trailer" or truck which is used to increase visibility in poor lighting conditions for visually performing safety inspections under a truck, the undercarriage lighting system comprising a plurality of retractable lights mounted to the front and rear of the undercarriage of the truck which may be retracted when not in use to protect the bulbs from road debris, an automatic timing control module, a manual trigger device and an inspection reminder system.

The purpose of the undercarriage light system of the present invention is to light-up the underneath of a vehicle so as to be able to see the condition of the vehicle in low light. The lights of the present invention will also aid to find fluid leaks such as engine oil, hydraulic oil, engine coolant, gear oil, low air pressure in rear inner tires. These are things that should be checked in a daily truck walk around before driving, but are sometimes difficult to see when lighting conditions are not favorable. The lights of the present invention are located in the front as well as in the back of the vehicle.

The present invention will also aid State Troopers/Inspectors on road side inspections when conditions are not favorable.

Components of the truck undercarriage lighting system of the present invention are as follows: A series of protected enclosed lights are positioned in strategic locations on the undercarriage of the truck so that when each light is energized, the lighting fixture lights up and extends from a protected cylinder to light one or more adjacent parts of the truck needing inspection. A control module regulates the lights. An automatic timing control is wired to the control module to control the amount of time the lights stay on. A outside manual push button trigger is wired to the control module to light the lights from outside the truck. An ignition trigger is wired to the control module to turn on the undercarriage lights when the truck is started. An indicator light in the cab reminds the operator that the undercarriage lights are on and reminds the operator to perform his walk around inspection. The light could be activated from outside the cab using the manual push button or inside the cab when the ignition key is turned on.

An advantage of the present invention is that it provides fixed lights underneath a vehicle in the front and back for the purpose of inspecting the undercarriage and brake component assembly.

Another advantage of the present invention is that it provides a time control module that controls the on and off function of the lights.

A further advantage of the present invention is that it provides a warning indicator light that the undercarriage lights are on and reminds the operator to make his/her walk around inspection.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings:

FIG. 3 is a partial perspective view of the preventive maintenance undercarriage lights of the present invention mounted on two truck axles adjacent to the tires with the lights wired into the control module;

FIG. 4 is a bottom plan view of the undercarriage of a tractor-trailer truck showing a plurality of the preventive maintenance undercarriage lights of the present invention and showing the effective lighting area of each of the lights;

FIG. 5 is a perspective view of a retractable preventive maintenance undercarriage light of the present invention with the lighting fixture extending out of the light enclosure for use;

FIG. 6 is a perspective view of the retractable preventive maintenance undercarriage light of FIG. 5 with the lighting fixture retracted into the light enclosure when not in use.

DETAILED DESCRIPTION OF THE INVENTION

Figure 1:
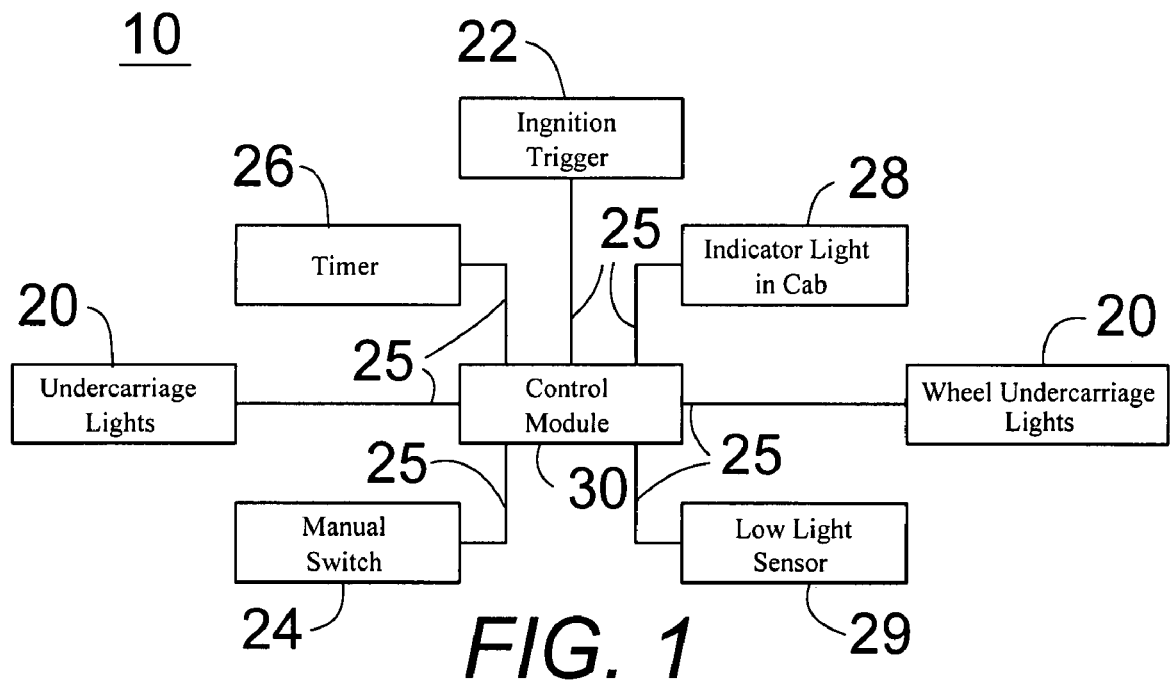
FIG. 1 is a partial elevational view of the preventive maintenance undercarriage lights of the present invention shown attached to the undercarriage area of a truck in three different locations adjacent to an inner tire to be inspected for low air pressure.

In FIGS. 1-6, a preventative maintenance undercarriage lighting system 10 for a vehicle 40, such as a tractor-trailer truck 40 or other vehicle requiring regular visual inspection of the undercarriage area 42, comprises a plurality of lights 20 to increase visibility in poor lighting conditions for visually performing safety inspections under the vehicle as well as an ignition trigger 22, a manual trigger device 24, an automatic timing control 26, an indicator light 28, and a low light sensor 29, all interconnected by electrical connectors, such as wires 25 to a control module 30 for operating the lights in response to the other components, as shown in FIGS. 1 and 3.

Figure 2:
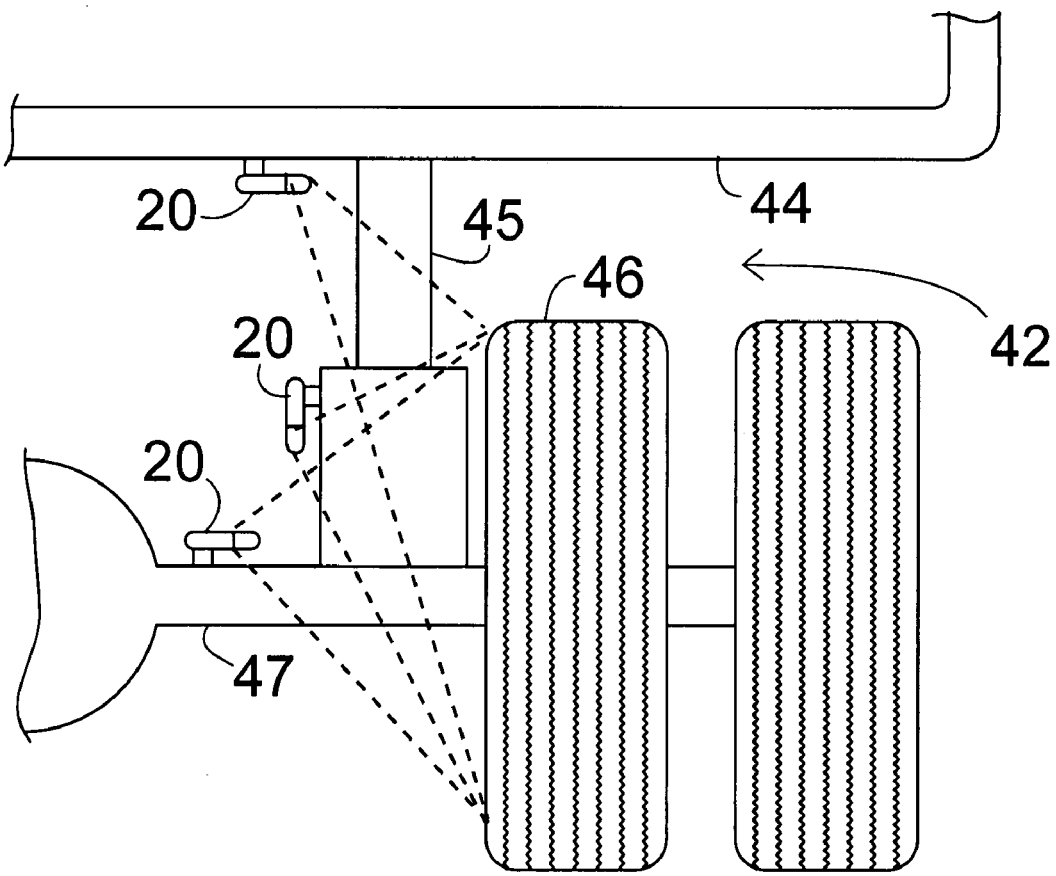
FIG. 2 is a diagrammatic view of the components of the preventive maintenance undercarriage light system of the present invention all interconnected through the control module.

The plurality of lights 20 are mounted on the undercarriage of a truck adjacent to parts of the truck requiring regular visual inspection to cast light thereon to enhance visual inspection and the plurality of lights are wired to a control module 30 for controlling the lights. In FIG. 2 a light 20 may be mounted on the bottom of the truck 44, the axle 47, or the shock absorber or truck body support 45 in the undercarriage area 42 to illuminate (shown by dashed lines) an inner tire 46 to check for low air pressure. In FIG. 3 the lights 20 are mounted on front and rear axles 47 to illuminate the tires 46 with the lights connected by wires 25 to the control module 30

The ignition trigger 22 is wired to the control module 30 to turn on the lights when the truck engine is started up.

The manual trigger device 24 is wired to the control module 30, the manual trigger device being mounted on an outside portion of the truck for a user to activate the lights 20 while the user is outside of a cab 41 of the truck 40.

The automatic timing control 26 is wired to the control module 30 to control the amount of time the lights 20 stay lighted;

The indicator light 28 is located in the cab 41 to remind a user that the undercarriage lights 20 are on and remind the user to perform a walk around inspection.

In FIG. 3, the preventative maintenance undercarriage lighting system 10 comprises a plurality of lights 20 attached to the axles 47 so that the lights illuminate the inner tires 46 to visually inspect for low air pressure. The lights are interconnected by wires 25 to the control module 30 which interacts with the ignition trigger 22 and the indicator light 28 both located in the cab of the truck and the manual trigger device 24, automatic timing control 26, and low light sensor 29, all attached to the outside of the truck.

In FIG. 4 the plurality of lights 20 is attached under the tractor-trailer truck 40 in the undercarriage area 42 with lights 20 primarily illuminating the inside tires 46 with one light attached to the interconnecting joint between the cab 41 and the trailer.

The plurality of lights 20 preferably comprise retractable lights, as shown in FIGS. 5 and 6, each comprising a light enclosure 21 attached to a part of the truck, the light enclosure housing a retractable lighting fixture 23 therein, wherein when each light 20 is energized, the lighting fixture 23 lights up and extends out from the light enclosure 21, as in FIG. 5, to light at least one adjacent part of the truck needing visual inspection, and when each light 20 is turned off the retractable lighting fixture 23 retracts into the light enclosure 21, as in FIG. 6, to protect the retractable lighting fixture from road debris.

At least one of the plurality of lights 20 is attached to the undercarriage area 42 of the truck 40 so that it aids in the visual inspection of at least one visual inspection item taken from the list of visual inspection items including fluid leaks, engine oil leaks, hydraulic oil leaks, engine coolant leaks, gear oil leaks, and tire air pressure in rear inner tires.

The low light sensor 29 is wired to the control module to turn on the plurality of lights 20 under low light conditions.

It is understood that the preceding description is given merely by way of illustration and not in limitation of the invention and that various modifications may be made thereto without departing from the spirit of the invention as claimed.

What is claimed is:

1. A preventative maintenance undercarriage lighting system for a truck to increase visibility in poor lighting conditions for visually performing safety inspections under the truck, the system comprising:

a plurality of lights mounted on the undercarriage of a truck adjacent to parts of the truck requiring regular visual inspection to cast light thereon to enhance visual inspection;

a control module wired to the lights for operating the lights;

an ignition trigger wired to the control module to turn on the lights when the truck is started;

a manual trigger device wired to the control module, the manual trigger device mounted on an outside portion of the truck for a user to activate the plurality of lights while the user is outside of a cab of the truck;

an automatic timing control module wired to the control module to control the amount of time the lights stay lighted;

an indicator light in the cab wired to the control module to remind a user that the undercarriage light is on and remind the user to perform a walk around inspection.

2. The system of claim 1 wherein at least one of the plurality of lights comprises a retractable light comprising a light enclosure attached to a part of the truck, the light enclosure housing a retractable lighting fixture therein, wherein when each light is energized, the lighting fixture lights up and extends out from the light enclosure to light at least one adjacent part of the truck needing visual inspection, and when each light is turned off the retractable lighting fixture retracts into the light enclosure to protect the retractable lighting fixture from road debris.

3. The system of claim 1 wherein at least one of the plurality of lights is attached to the undercarriage of the truck in a location so that it aids in the visual inspection of at least one visual inspection item taken from the list of visual inspection items including fluid leaks, engine oil leaks, hydraulic oil leaks, engine coolant leaks, gear oil leaks, and tire air pressure in rear inner tires.

4. The system of claim 1 further comprising a low light sensor switch wired to the control to turn on the plurality of lights under low light conditions.

* * * * *